United States Patent [19]

Mott

[11] E Patent Number: Re. 32,473

[45] Reissued Date of Patent: Aug. 11, 1987

[54] FLAME-RETARDANT POLYMER COMPOSITIONS CONTAINING METAL SALTS

[75] Inventor: Donna Mott, Des Plaines, Ill.

[73] Assignee: Borg-Warner Chemicals, Inc., Parkersburg, W. Va.

[21] Appl. No.: 596,129

[22] Filed: Apr. 2, 1984

Related U.S. Patent Documents

Reissue of:

[64] Patent No.: 4,365,033
Issued: Dec. 21, 1982
Appl. No.: 279,634
Filed: Jul. 2, 1981

[51] Int. Cl.[4] ..... C08K 5/52

[52] U.S. Cl. ..... 524/118; 524/412; 524/416

[58] Field of Search ..... 260/937; 524/118

[56] References Cited

U.S. PATENT DOCUMENTS

| | | | |
|---|---|---|---|
| 3,780,142 | 12/1973 | Ogawa et al. | 524/144 |
| 3,810,850 | 5/1974 | Rowton | 521/163 |
| 3,959,220 | 5/1976 | Hechenbleikner | 524/118 |
| 4,003,861 | 1/1977 | Savides et al. | 521/166 |
| 4,061,605 | 12/1977 | Simon | 521/108 |
| 4,080,501 | 3/1978 | Leman et al. | 544/195 |
| 4,098,759 | 7/1978 | Noetzel et al. | 524/118 |
| 4,143,101 | 3/1979 | Mayerhoefer et al. | 260/937 |
| 4,201,705 | 5/1980 | Halpern | 521/90 |

FOREIGN PATENT DOCUMENTS

| | | | |
|---|---|---|---|
| 2101602 | 1/1983 | United Kingdom | 260/937 |

*Primary Examiner*—John Kight
*Assistant Examiner*—Kriellion Morgan
*Attorney, Agent, or Firm*—Emily A. Richeson

[57] ABSTRACT

Polymer compositions containing minor proportions of polyvalent metal or amine salts of 5,5-bis-(bromomethyl)-2-hydroxy-2-oxo-1,3,2-dioxaphosphorinane. Aluminum, calcium and melamine salts are preferred.

8 Claims, No Drawings

FLAME-RETARDANT POLYMER COMPOSITIONS CONTAINING METAL SALTS

Matter enclosed in heavy brackets [ ] appears in the original patent but forms no part of this reissue specification; matter printed in italics indicates the additions made by reissue.

This invention relates as indicated to certain flame-retardant polymer compositions and, more particularly, to such compositions which owe their flame-retardant properties to the presence of small proportions of amine or metal salts, more particularly defined hereinafter.

BACKGROUND OF THE INVENTION

Polymers vary widely in their resistance to burning. Some, such as the polyolefins, polystyrene, polyalkyl acrylates and methacrylates, and the like, burn readily. Polytetrafluoroethylene, polyvinylidene chloride and polyvinyl chloride, on the other hand, have a rather high resistance to burning. In any event, it obviously is highly desirable that, for certain applications, a polymer should have a high degree of flame retardance so that it will meet the requirements of various building codes or that it will meet safety standards imposed on toys, carpeting, drapery materials, automotive applications, etc.

The treatment of these more flammable polymers to increase their resistance to burning is well known; such treatment generally has involved the incorporation in the polymer composition of substantial proportions of antimony oxide, halogenated hydrocarbons and low molecular weight phosphate esters. Ordinarily, though, the effective use of these and other additives has required their presence in such high concentrations as to adversely affect the desirable properties of the polymer. Thus, such desirable properties as hardness, clarity, strength, elasticity, etc., are diminished significantly by the presence of large amounts of a flame-retardant chemical.

The formulator's goal, in preparing a flame-retardant polymer composition, is to add just enough of the flame retardant compound so as to provide the desired degree of flame retardance, but no more than this minimum amount, so as to preserve as much as possible the advantageous properties of the polymer. Frequently, it is not possible to select a flame-retardant which will meet these requirements satisfactorily.

U.S. Pat. No. 3,877,655 (Shim) shows the use of phosphoramidate esters of dibromoneopentylglycol as flame-retardant additives in a wide variety of polymer compositions. The phosphoramidate for which flame-retardant test data is shown is the N,N'-dimethylamide.

U.S. Pat. No. 4,041,012 (Albright et al.) shows the use of acrylate esters of dihaloneopentylglycol phosphates as flame-retardant additives in acrylic polymer compositions. The esters are incorporated in polyacrylate compositions by copolymerization with methyl methacrylate, for example, although at column 7, lines 15–59, it is stated that they may be used in combination with known synergists in other types of polymers "such as polystyrene" (see line 37).

The preparation of the calcium salt of pentaerythritoldiiodohydrin phosphoric acid is shown in "Iodine-Containing Aliphatic Phosphoric Acid Esters," Eidenbenz et al., Arch. Pharm. 280, 227–31 (1942).

SUMMARY OF THE INVENTION

The present invention is a composition comprising a normally flammable polymer and a minor proportion, sufficient to impart flame-retardant properties to said composition, of a salt of 5,5-bis(bromomethyl)-2-hydroxy-2-oxo-1,3,2-dioxaphosphorinane having the structure

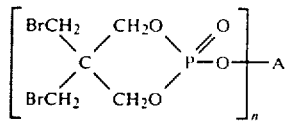

where A is a polyvalent metal or amine group and n is an interger corresponding to the valence of A.

DETAILED DESCRIPTION OF THE INVENTION

Polyvalent metals contemplated above include aluminum, calcium, magnesium, barium, chromium, strontium, silver, titanium, nickel, copper, zinc, iron, cobalt, manganese, molybdenum, zirconium, cadmium, bismuth, lead, tin, vanadium, antimony, etc. Aluminum and calcium are preferred.

The amine preferably is an amino-s-triazine. Melamine is especially preferred.

The polyvalent metal and amine salts herein may be prepared by reacting the corresponding acid or the acid chloride thereof with a polyvalent metal halide, a basic polyvalent metal base, or amine. The process is described in more detail in an application for patent, Ser. No. 279,636, entitled "Salts of 5,5-Bis-(Bromomethyl)-2-Hydroxy-2-Oxo-1,3,2-Dioxaphosphorinane and Process for Preparing Same," filed concurrently herewith. The subject matter of that application is incorporated herewith by reference.

Preparation of the flame-retardant compositions of this invention (for test purposes) may be accomplished by mixing the ingredients in an electrically heated Brabender head for about 10 minutes at 200° C. and 60 rpm. The test specimens for which data is shown in the Table are prepared from compression molded slabs.

The flame retardance of a plastic material can be determined by means of Underwriters Laboratories Test UL-94. The test specimen measures 5"×0.5"×0.125"; it is suspended vertically at a measured height above the flame from a Bunsen burner. After 10 seconds the flame again is removed and the duration of the flaming of the test specimen is noted. Immediately, the flame is placed again under the specimen and after 10 seconds the flame again is withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not specimens burn up to their point of suspension; and (5) whether or not specimens drip flaming particles which ignite a cotton swatch placed 12 inches beneath the test specimen. The highest rating given to a material is "V-0". It indicates that (1) no specimen burns with flaming combustion for more than 10 seconds after each application of the test flame; (2) the material does not have a flaming combustion time exceeding 50 seconds for the 10 flame applications for each set of 5 specimens; (3) no specimen burns with flaming or glowiong combustion up to the holding clamp; (4) no specimen drips flaming particles that ignite the dry cotton beneath the specimen; and (5) no specimen glows for more than 30 seconds after the second removal of the flame.

The next highest rating is "V-1". It indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen; and (5) no specimen glows for more than 60 seconds after the second removal of the flame.

The lowest rating given to a material in this test is "NSE" ("non-self-extinguishing"). It indicates that the material has failed to meet one or more of the criteria for the UL-94 vertical test.

Another test for the flammability of a plastic material measures the minimum concentration of oxygen that will just support combustion. The test is an ASTM test, D 2863-70. It is carried out in a glass column wherein the concentration of oxygen is varied until that concentration is found which will just support the burning of a test specimen, for 3 minutes or until 50 mm of the specimen has burned. The test specimen is 70–150 mm long by 6.5 mm wide by 3.0 mm thick. This concentration of oxygen is called the oxygen index. A high oxygen index (O.I.) indicates a highly flame-retardant specimen.

The effectiveness of the polymer compositions herein in resisting flaming is shown in the Table below. The indicated amounts are pph (parts per hundred parts of resin).

| Additive | PP[1] | | | | HIPS[2] | | PS[3] | | | ABS[4] | | |
|---|---|---|---|---|---|---|---|---|---|---|---|---|
| Al salt[5] | | | | | 20.6 | | 20.6 | | | 24.7 | | |
| Ca salt[5] | | | | 22.2 | | 26.6 | | | | | 26.6 | 26[4] |
| Melamine salt[5] | 27 | 15[6] | 12[6] | | | | | 24 | 15[6] | | | |
| $Sb_2O_3$ | | | | 4 | 4 | | 4 | 4 | | 4 | 4 | 4 |
| UL-94 | V-1 | V-0 | V-1 | V-2 | V-2 | V-2 | V-2 | V-2 | V-2 | V-0 | V-0 | V-0 |
| O.I. | 26.2 | 33.0 | 31.1 | 25.9 | 20.7 | 22.7 | 23.5 | 23.8 | 26.0 | 24.5 | 24.2 | 25.1 |

[1]polypropylene
[2]high impact polystyrene (polystyrene grafted onto polybutadiene)
[3]polystyrene
[4]a copolymer of styrene and acrylonitrile grafted onto polybutadiene
[5]of 5,5-bis-(bromomethyl)-2-hydroxy-2-oxo-1,3,2-dioxaphosphorinane
[6]also contains 15 pph of ammonium polyphosphate The metal or amine salt additives herein should ordinarily be used in concentrations ranging from about 20 pph (parts per hundred parts of resin) to about 32 pph. When desired, antimony trioxide may be used as a synergist in concentrations ranging from about 2 pph to about 12pph.

All parts and percentages herein, unless otherwise expressly stated, are by weight.

We claim:

1. A composition comprising a normally flammable polymer and a minor porportion, sufficient to impart flame-retardant properties to said composition, of a salt of 5,5-bis (bromomethyl)-2-hydroxy-2-oxo-1,3,2-dioxaphosphorinane having the structure

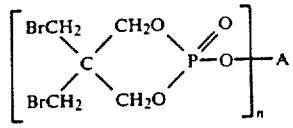

where A is a polyvalent metal [or protonated amino-s-triazine group] and n is an integer corresponding to the valence of A.

2. The composition of claim 1 wherein A is aluminum.

3. The composition of claim 1 wherein A is calcium.

4. The composition of claim 1 wherein the normally flammable polymer is a polymer of styrene.

5. The composition of claim 1 wherein the normally flammable polymer is an olefin polymer.

6. The composition of claim 4 wherein the normally flammable polymer is an ABS resin.

7. The composition of claim 4 wherein the normally flammable polymer is polystyrene.

8. The composition of claim 5 wherein the normally flammable polymer is polypropylene.

* * * * *